(12) United States Patent
Oriols Gaja et al.

(10) Patent No.: US 10,859,432 B2
(45) Date of Patent: Dec. 8, 2020

(54) APPARATUS FOR GRAVITY EMPTYING BOTTLES CONTAINING FROZEN BLOOD PRODUCT COMPRISING A UNIT FOR MONITORING EMPTYING AND EMPTYING METHOD

(71) Applicant: GRIFOLS WORLDWIDE OPERATIONS LIMITED, Dublin (IE)

(72) Inventors: Joan Oriols Gaja, Barcelona (ES);
Daniel Fleta Coit, Barcelona (ES);
Jose Luis Gomez Flores, Barcelona (ES)

(73) Assignee: GRIFOLS WORLDWIDE OPERATIONS LIMITED, Dublin (IE)

( * ) Notice: Subject to any disclaimer, the term of this patent is extended or adjusted under 35 U.S.C. 154(b) by 246 days.

(21) Appl. No.: 16/156,872

(22) Filed: Oct. 10, 2018

(65) Prior Publication Data
US 2019/0120686 A1   Apr. 25, 2019

(30) Foreign Application Priority Data

Oct. 24, 2017   (EP) .................................... 17382713

(51) Int. Cl.
*G01G 19/18* (2006.01)
*G01G 23/00* (2006.01)
(Continued)

(52) U.S. Cl.
CPC ............. *G01G 19/18* (2013.01); *A61J 1/18* (2013.01); *B65B 57/00* (2013.01); *B65B 69/00* (2013.01);
(Continued)

(58) Field of Classification Search
CPC ........ G01G 19/18; G01G 15/00; G01G 17/06; G01G 23/00; A61J 1/16; A61J 1/18;
(Continued)

(56) References Cited

U.S. PATENT DOCUMENTS

| 3,957,168 A | 5/1976 | Shine et al. | |
|---|---|---|---|
| 2003/0176833 A1* | 9/2003 | Libermann | A61M 3/0241 604/65 |
| 2011/0064612 A1* | 3/2011 | Franzoni | A61M 5/1689 422/44 |
| 2012/0123721 A1 | 5/2012 | Yeon et al. | |
| 2013/0233394 A1* | 9/2013 | Nguyen | A61J 1/20 137/2 |

(Continued)

FOREIGN PATENT DOCUMENTS

| EP | 1348631 A1 | 10/2003 |
|---|---|---|
| EP | 2669644 A1 | 12/2013 |
| ES | 2245836 A1 | 1/2006 |

OTHER PUBLICATIONS

European Search Report of corresponding Patent Application No. 17382713—5 pages (dated Mar. 15, 2018).

*Primary Examiner* — Natalie Huls
(74) *Attorney, Agent, or Firm* — Knobbe, Martens, Olson & Bear, LLP

(57) ABSTRACT

Disclosed is an apparatus for emptying bottles containing frozen blood product. The apparatus comprises an automatic unit for checking the weight of emptied bottles. The automatic unit comprises a load detection system for measuring the weight of emptied bottles, an air pressure measuring unit for measuring the pressure in the room in which the emptying apparatus is located, and a measurement compensation unit for correcting the load value on the basis of the room pressure measurement. The weight-checking unit generates a "not empty" signal if the value of the corrected load is greater than or equal to a predetermined value.

5 Claims, 4 Drawing Sheets

(51) Int. Cl.

| | |
|---|---|
| *B65B 69/00* | (2006.01) |
| *B65B 57/00* | (2006.01) |
| *B65G 65/23* | (2006.01) |
| *A61J 1/18* | (2006.01) |
| *G01G 15/00* | (2006.01) |
| *G01G 17/06* | (2006.01) |
| *A61J 1/16* | (2006.01) |
| *G01V 8/12* | (2006.01) |

(52) U.S. Cl.
CPC .......... *B65B 69/0033* (2013.01); *B65G 65/23* (2013.01); *G01G 15/00* (2013.01); *G01G 17/06* (2013.01); *G01G 23/00* (2013.01); *A61J 1/16* (2013.01); *A61J 2200/74* (2013.01); *G01V 8/12* (2013.01)

(58) Field of Classification Search
CPC ...... A61J 2200/74; B65B 57/00; B65B 69/00; B65B 69/0033; B65G 65/23
See application file for complete search history.

(56) References Cited

U.S. PATENT DOCUMENTS

| | | | |
|---|---|---|---|
| 2014/0017142 A1* | 1/2014 | Mehus ................ | B67D 7/08 422/261 |
| 2016/0331894 A1* | 11/2016 | Harmon ................ | A61J 1/18 |
| 2017/0315121 A1* | 11/2017 | Wegener ............ | A61M 1/362 |
| 2017/0340799 A1* | 11/2017 | Schlinker ............ | A61M 1/0209 |
| 2019/0119050 A1* | 4/2019 | Oriols Gaja ............ | A61J 1/165 |
| 2019/0231964 A1* | 8/2019 | Uhlmann ............ | A61M 1/3692 |

* cited by examiner

APPARATUS FOR GRAVITY EMPTYING BOTTLES CONTAINING FROZEN BLOOD PRODUCT COMPRISING A UNIT FOR MONITORING EMPTYING AND EMPTYING METHOD

BACKGROUND

Technical Field

The present application discloses an apparatus for gravity emptying bottles containing frozen blood product and to a method for determining if the bottles of frozen blood plasma have been completely emptied or if any remnants remain or even if a bottle is still completely full after the emptying procedure. More specifically, the present application discloses an apparatus for checking if the emptying procedure has been carried out correctly by means of a unit for checking the weight corrected by means of compensating for the pressure of a bottle or a plurality of bottles, and the operating method thereof.

Blood plasma is collected from donors and pharmaceutical laboratories place said plasma in containers and freeze it in order to preserve it until it is used. The procedure for emptying out frozen blood plasma is carried out by means of a bottle emptier. A bottle emptier is usually known to be an apparatus tasked with the process of emptying out blood plasma placed in bottles. It is important for there be a step of monitoring the emptying procedure, i.e. of ascertaining that no remnants remain inside the plasma bottles, because there is the risk of wasting blood product, which is expensive and in short supply.

RELATED ART

Spanish patent ES 2245836 A1 discloses an apparatus for emptying blood plasma bottles similar to that described above. However, one problem observed with blood product emptiers that operate by gravity is that, occasionally, remnants of frozen blood product remain stuck to the wall of the bottle or container and do not fall out.

According to the prior art, this can be solved by the supervision of an operator who visually inspects the emptying procedure, stopping the bottle emptier when said person detects remnants in a bottle. However, practice has shown that detection errors occur as a result of the attention of the operator waning significantly over prolonged periods of time in which the apparatus is in operation. The applicant has carried out tests using visual recognition modules in order to replace the operator. However, due to there being thawed liquid stuck to the bottle walls and due to the possibility of the remnants remaining stuck to the base and not to the side walls, the visual recognition module also produces detection errors, i.e. produces false positives and/or false negatives. Therefore, it is important to have an apparatus for gravity-emptying bottles that comprises a system for detecting remnants of blood product in order to prevent said remnants from remaining in the bottles or containers after the emptying procedure.

SUMMARY

The present application discloses a technical solution to this problem, in which the bottles are weighed in order to determine if they have been emptied completely. However, given the geometry of the robot support structure, the size thereof and the overpressure and pressure fluctuations in the room in which it is installed, the measurements carried out by the weighing cells may differ from the actual weight borne thereby. In accordance with embodiments of the present invention, correcting the weight on the basis of the pressure in the room makes it possible to obtain the weight of a plasma bottle with high precision and to know if remnants remain inside said bottle.

An aspect of the present invention is to ensure that no remnants of blood product remain inside the plasma bottles after the emptying procedure. The apparatus for emptying bottles compares the corrected weight value of the bottle or set of bottles with the value of the bottle or set of bottles calibrated at the start in order to ensure that no remnants remain inside said bottle or set of bottles.

More particularly, embodiments of the present invention aims to provide a bottle emptier having means for determining, in a reliable and automatic manner, if the gravity-emptying operation has been successful. To do this, the present disclosure discloses an apparatus for gravity-emptying bottles of frozen blood product which comprises a unit for monitoring emptying. Said unit for monitoring emptying comprises an automatic unit for checking the weight of emptied bottles, which in turn comprises a load detection system for measuring the weight of emptied bottles without correcting said weight; an air pressure measuring unit for measuring the pressure in the room in which the emptying apparatus is located; and a measurement compensation unit for correcting the load value provided by the load detection system on the basis of the room pressure measurement provided by the air pressure measurement unit; such that the weight-checking unit generates a "not empty" signal if the value of the corrected load is greater than or equal to a predetermined value.

The bottle-emptying apparatus comprises an automatic weight-checking unit which is configured to compensate for the effect of the pressure in the room where said apparatus is located. Preferably, the automatic weight-checking unit is designed to obtain, with high precision, the weight of the bottles and the contents thereof on the basis of the values obtained from the load detection system and the pressure measurements in the room in which the emptying apparatus is located.

An aspect of the present invention also discloses an optical device for confirming, in a complementary manner, that no remnants remain in any of the plasma bottles after the emptying procedure and for ensuring that said procedure is being carried out correctly. The optical device mentioned comprises an infrared sensor of the "red eye" type which generates a detection signal when a surface or element interferes in the detection range thereof.

Due to the fact that it handles a blood product, the bottle-emptying apparatus must operate in a clean or aseptic room in which said apparatus is subject to overpressure with respect to atmospheric pressure. When the door of said room is opened, the air pressure decreases and the weight measurements may be different to those of the actual weight being carried. The room is equipped with an air treatment unit which, together with the opening/closing of the room return pipes, makes it possible to adjust the pressure in the room.

There are two physical fundamentals by which the variation in pressure affects the weight measurement: the first is related to the form factor and the location of weighing cells of the apparatus, while the second cause is related to Archimedes' principle. With regard to the form factor and the location of weighing cells of the apparatus, the pressure which acts on the flank of the apparatus is compensated for because the forces created by the pressure acting on the flank of the apparatus eventually balance out; however, the same does not occur on the upper and lower surfaces, where the forces resulting from the pressure are not compensated for due to the geometry of the apparatus and the weighing cells are affected by the pressure in the room. Said weighing cells are usually located in the upper portion of the emptying apparatus, specifically between the apparatus support attached to the ceiling and the ceiling. In particular, the weighing cells are located in an upper structure between the apparatus support attached to the ceiling and the ceiling. With regard to Archimedes' principle, the apparatus is not considered to be in a vacuum but surrounded by air, i.e. submerged in a fluid. Archimedes' principle states that any body submerged in a fluid experiences a vertical upward thrust equal to the weight of the displaced fluid. The weight of the displaced fluid depends on the density of said fluid. When the pressure in the room fluctuates, the density of the air varies and, as a result, the thrust delivered by the air to the device changes. In order to obtain a precise reading of the weight (detect approximately 100 grams out of the total mass of 300 kilograms), the applicant has additionally provided embodiments of the present invention with an upper structure containing the triangulation of said weighing cells which takes the weighing points outside the farthest apparatus trajectory such that all the resulting force components are vertical.

From this point on, the uncorrected weight will be defined as the load and differs from the actual weight when there are variations in the pressure in the room with respect to atmospheric pressure.

The plasma bottles contain blood product. Preferably, the bottles contain blood plasma. More preferably, the bottles contain frozen blood plasma in solid form.

The bottle-emptier opens the batch of bottles and empties the contents of the plasma bottles. Preferably, but not necessarily, the emptying apparatus comprises a cutting tool which cuts through the upper end of the bottle, which becomes detached and falls into a funnel, and the plasma contained in the bottle is emptied by gravity into a collecting funnel.

Preferably, but not necessarily, the load detection system consists of weighing cells that convert the force applied into a measurable electrical signal. More preferably, the load is measured by means of the load detection system using a system of three weighing cells.

Preferably, but not necessarily, the weight-checking unit is located in the upper portion of the apparatus, near the support structure, and suspends the robot and the bottles that said robot handles.

Preferably, but not necessarily, in a manner complementary to the weight-checking unit, the apparatus comprises an optical device for checking that the emptying procedure has been carried out correctly. More preferably, the optical device comprises an infrared sensor.

Preferably, but not necessarily, the apparatus further comprises an air treatment unit which, together with the opening/closing of the room return pipes, makes it possible to adjust the overpressure in the room.

An aspect of the present invention relates to a bottle-emptying method comprising the steps of:
 a) opening the batch of plasma bottles;
 b) emptying the batch of plasma bottles, the blood product falling by the force of gravity;
 c) obtaining load data provided by the load detection system;
 d) obtaining room pressure data provided by the air pressure measurement;
 e) correcting the load value by means of the pressure compensation unit;
 f) detecting remnants of blood product after the emptying procedure by means of a weighing mode using a weight-checking unit and by means of an optical inspection mode, wherein the weighing mode is based on the difference in corrected weight between the batch of plasma bottles and a reference of known and calibrated mass and on the optical inspection mode by means of an infrared device.

BRIEF DESCRIPTION OF THE DRAWING

To aid understanding, explanatory yet non-limiting drawings of an embodiment of an apparatus for gravity-emptying bottles containing frozen blood product are included.

DETAILED DESCRIPTION

Figure 1:
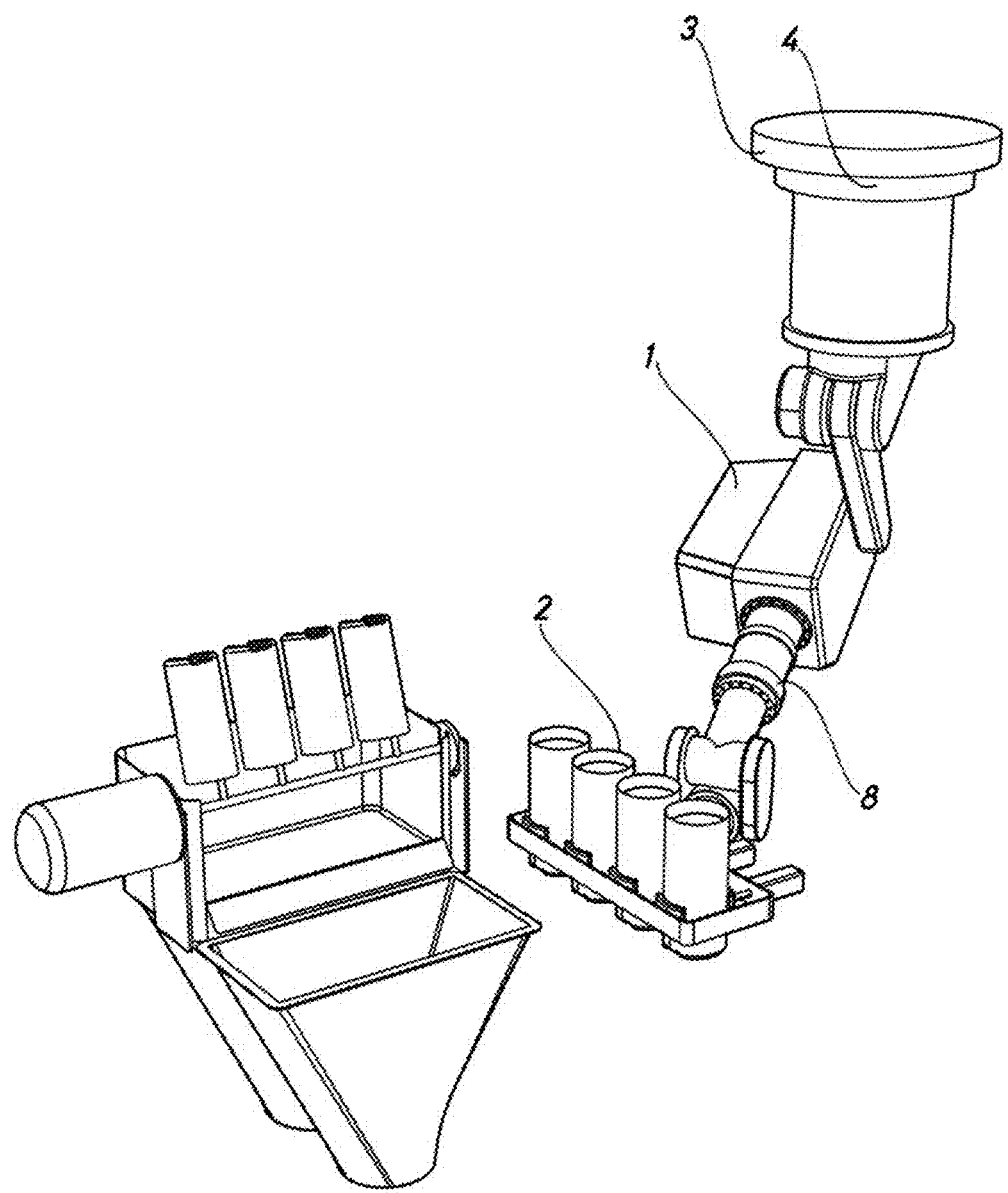
FIG. 1 is a perspective view of an automatic bottle-emptying apparatus according to an embodiment of the present invention.
Figure 2:
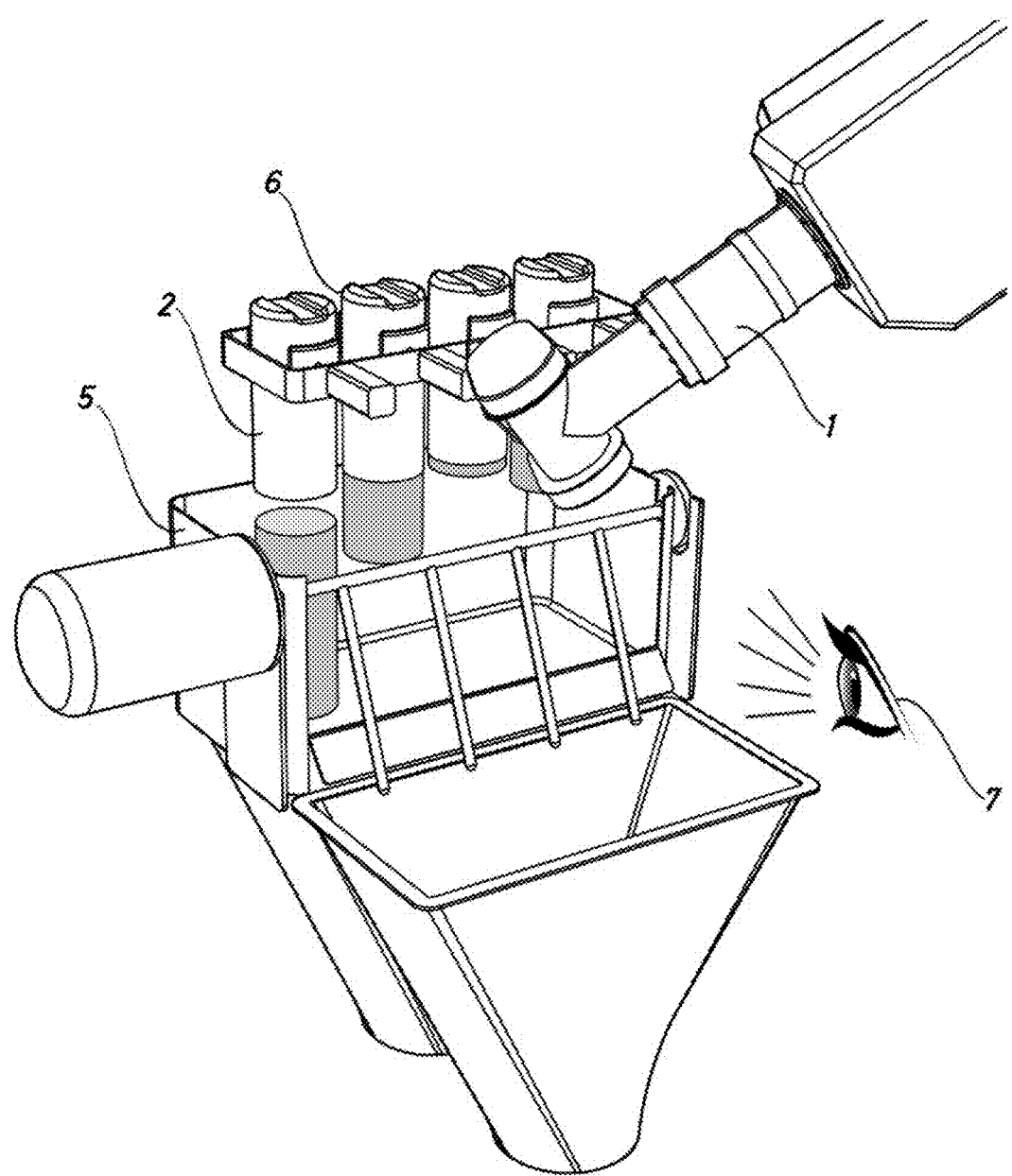
FIG. 2 is a perspective view of the automatic bottle-emptying apparatus from FIG. 1 carrying out the emptying procedure.

An embodiment will be described in the following with reference to the accompanying drawings.

The bottle -2- gravity emptier -1- is an apparatus which is tasked with the process of emptying frozen blood plasma placed in bottles -2-. The apparatus -1- for emptying bottles -2- incorporates a cutting tool which cuts through the upper end of the plasma bottle -2-, which becomes detached and falls into a funnel (not shown) which allows the blood product contained in the bottle -2- to fall, by the force of gravity, into the collecting funnel -5-. For this purpose, a robotic arm -8- equipped with a special holding tool grips the batch of plasma bottles, which has a gripping means for the apparatus, and positions said bottles above the funnel -5- for collecting blood product. Once the bottles are above said funnel -5-, the robotic arm -8- inverts the plasma bottles and, by the force of gravity, the blood product falls into said collecting funnel -5-.

The bottle -2- emptier -1- is an apparatus which comprises a unit for monitoring emptying, which in turn comprises an automatic weight-checking unit -4- for monitoring the blood-product emptying procedure by detecting remnants. The apparatus comprises an optical device -7- which in turn comprises an infrared sensor which, in a manner complimentary to the weight-checking unit -4-, makes it possible to check that the emptying procedure has been carried out correctly. The sensor generates a detection signal when a surface or element interferes in the detection range thereof. The infrared sensor carries out thermography on the bottles and the contents of said bottles in the infrared spectrum. Said sensor creates images from the emissions from the detected bodies in the mid-infrared range on the electromagnetic spectrum. All bodies emit a certain quantity of black body radiation (in the form of infrared) depending on the temperature thereof, which makes it possible to detect the infrared energy emitted, transmitted or reflected by all materials at temperatures greater than absolute zero (0° Kelvin). Said sensor detects the residual contents by means of the temperature difference from the rest of the room. Another possibility would be to use a sensor in the visible spectrum (camera).

The laboratory room where the apparatus is located may be at a pressure that is different from atmospheric pressure. It is common in this type of operation to have rooms or chambers subject to overpressure. The load measurement of a known and constant mass may differ from the actual weight of said mass since the measurements of a load detection system depend on the pressure of the air in the room where said measurement was carried out.

The apparatus -1- for emptying bottles -2- comprises a weight-checking unit -4- which is configured to compensate for the effect of the pressure in the room where said apparatus is located. In particular, the weight-checking unit -4- is designed to obtain, with high precision, the weight of plasma bottles -2- by correcting the load measurements using the compensation of the pressure in the room in order to find out if there are any remnants inside any bottle.

The configuration of a weight-checking unit -4- makes it possible to measure, in a highly precise manner, the weight of a load by compensating for the pressure in the room. The weight-checking unit -4- comprises a load detection system, an air pressure measuring unit and a pressure compensation unit. The load detection system and the air pressure measuring unit are mounted together with the pressure compensation unit in an additional structure (not shown) in the upper portion of the support structure -3-, such that the bottle -2- emptier -1- has a weight-checking unit -4- from which said apparatus -1- and the bottles -2- said apparatus handles are suspended.

A batch -6- of plasma bottles consists of a plurality of plasma bottles grouped together by means of a gripping means. Preferably, but not necessarily, the batch -6- is formed of four plasma bottles.

The load detection system measures the load of the batch -6- of plasma bottles. However, due to the overpressure and pressure fluctuations in the room, the measurements carried out by the load detection system may differ from the actual weight borne thereby. Preferably, the load detection system consists of weighing cells that convert the force applied into a measurable electrical signal. More preferably, the load is measured by means of the load detection system using a system of three weighing cells.

The air pressure measuring unit measures the pressure in the room in which the emptying apparatus -1- is located, and sends the information to the pressure compensation unit.

The pressure compensation unit obtains the load measurements provided by the load detection system and the air pressure measurements provided by the air pressure measuring unit. The pressure compensation unit corrects the load measurement provided by the load detection system on the basis of the measurements of the overpressure in the room provided by the air pressure measuring unit. Therefore, the pressure compensation unit uses a weight algorithm to calculate the corrected weight on the basis of the measurement of the air pressure in the room and on the load measurement. The weight-checking unit -4- generates a "not empty" signal if the value of the corrected weight is greater than or equal to a predetermined value.

A reference of known and calibrated mass is used in the calibration method in order to obtain the mathematical correlation between the pressure in the room and the measurements of the load detection system -4a-.

The apparatus for emptying bottles -1- monitors the emptying procedure by detecting remnants of blood product in a bottle -2- once said emptying procedure has been completed using the difference in corrected weight between the batch -6- of plasma bottles and the reference of known and calibrated mass. Preferably, an optical device -7- is also used in a manner complementary to the weight-checking unit -4-.

Figure 3:
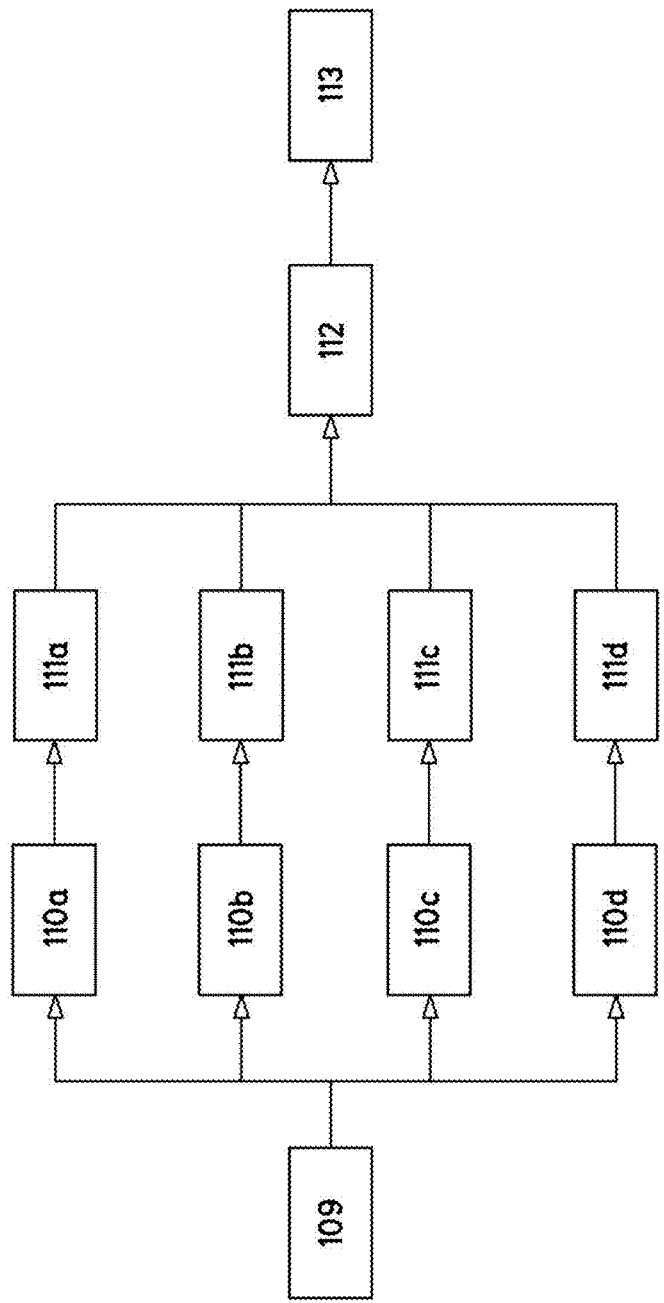
FIG. 3 is a schematic flow diagram of the calibration method for obtaining, in each situation, the mathematical correlation between the pressure in the room and the measurement of the load detection system.

The method for calibrating a reference is explained as follows using the flow diagram from FIG. 3: firstly, a reference is placed -109- in a gripping means that forms part of the bottle emptier. Next, the load -111a- of the reference is measured at the pressure in the room -110a-. Next, the pressure in the room is changed -110b- and new load measurements are carried out -111b-. As a result, a plurality of load measurements is obtained -111a-, -111b-, -111c-, -111d- along with the respective air pressure measurements -110a-, -110b-, -110c-, -110d- thereof. The apparatus comprises an air treatment unit which, together with opening/closing of the room return pipes, makes it possible to adjust the overpressure in the room. Subsequently, the mathematical correlation -112- between the load measurements -111a-, -111b-, -111c-, -111d- of the reference and the air pressure measurements -110a-, -110b-, -110c-, -110d- is obtained. Said mathematical correlation -112- is then input into the weight algorithm -113- such that when the bottle-emptying apparatus is in operation, the values measured by a load detection system are corrected in accordance with the pressure in the room.

Figure 4:
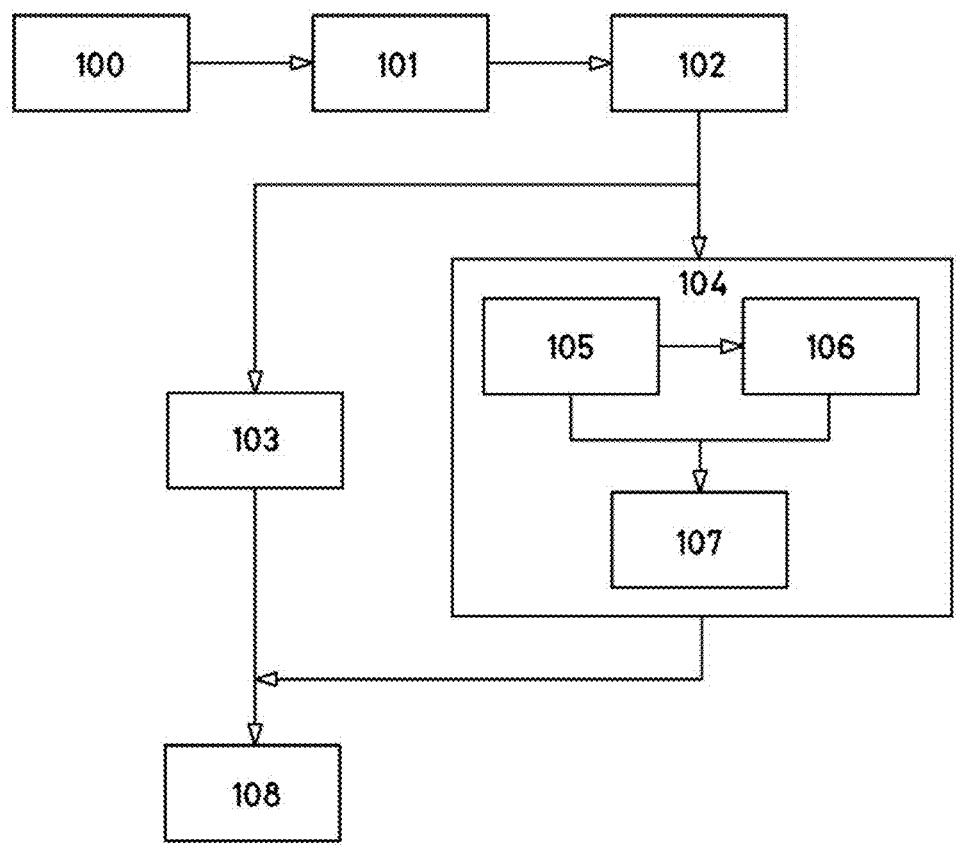
FIG. 4 is a flow diagram of the method according to an embodiment of the present invention, in which the emptier checks that the emptying procedure has been carried out in full and that no remnants of blood product remain in the plasma bottles.

The bottle-emptying method for monitoring the emptying procedure, as shown in the flow diagram from FIG. 4, comprises the following steps: firstly, a plasma bottle or a plurality of plasma bottles is placed in a gripping means that forms part of a bottle-emptying apparatus. Next, the apparatus comprises a cutting tool or the like which cuts through -100- the upper end of the plasma bottle which becomes detached and falls into a funnel (not shown) and the plasma contained in the bottle is emptied -101- into a collecting funnel by the force of gravity. The bottle-emptying apparatus monitors the emptying procedure -102- to confirm that said emptying procedure has been completed correctly. The emptying procedure -102- is monitored by means of a weighing system -104- and optionally, and in a complementary manner, by an optical inspection system -103-. The weighing system -104- receives load measurements -105- provided by a load detection system and room pressure measurements -106- provided by an air pressure measuring unit. Subsequently, the corrected weight -107- is calculated by balancing the load measurements -105- on the basis of the room pressure measurements -106-. Finally, a "not empty" signal -108- is generated if the value of the corrected weight is greater than or equal to a predetermined value. Preferably, said predetermined value is configured by means of the difference in corrected weight between the batch of plasma bottles and the reference. More preferably, said predetermined value is also configured on the basis of the output response of the optical inspection system -103-.

Although the invention has been set out and described with reference to embodiments thereof, it should be understood that these do not limit the invention, and that it is possible to alter many structural or other details that may prove obvious to persons skilled in the art after interpreting the subject matter disclosed in the present description, claims and drawings. Therefore, the scope of the present invention includes any variant or equivalent that could be considered covered by the broadest scope of the following claims.

What is claimed is:

1. An apparatus for gravity-emptying bottles containing frozen blood product, the apparatus comprising an automatic unit for checking the weight of emptied bottles, wherein the automatic unit comprises:
   a) load detection system for measuring the weight of emptied bottles;
   b) an air pressure measuring unit for measuring the pressure in the room in which the emptying apparatus is located; and
   c) a measurement compensation unit for correcting the load value provided by the load detection system on the basis of the room pressure measurement provided by the air pressure measurement unit, wherein the weight-checking unit is configured to generate a "not empty" signal if the value of the corrected load is greater than or equal to a predetermined value.

2. The apparatus according to claim 1, further comprising an optical device for confirming that the emptying procedure is being carried out correctly.

3. The apparatus according to claim 2, wherein the optical device comprises a proximity detection module which generates a detection signal by means of an infrared sensor when a surface or element interferes in the detection range of the optical device.

4. The apparatus according to claim 1, wherein the load detection system is formed of three weighing cells.

5. A method for gravity-emptying bottles containing frozen blood product, the method comprising:
   a) opening a batch of plasma bottles;
   b) emptying the batch of plasma bottles, the blood product falling by the force of gravity;
   c) obtaining load data provided by a load detection system;
   d) obtaining room pressure data provided by an air pressure measurement;
   e) correcting the load value by means of a pressure compensation unit; and
   f) detecting remnants of blood product after the emptying procedure by means of a weighing mode using a weight-checking unit and by means of an optical inspection mode, wherein the weighing mode is based on the difference in corrected weight between the batch of plasma bottles and a reference and on the optical inspection mode by means of an infrared device.

* * * * *